(12) United States Patent
Martin et al.

(10) Patent No.: US 9,343,829 B2
(45) Date of Patent: May 17, 2016

(54) SYSTEM FOR ELECTRICALLY CONNECTING EQUIPMENT UNITS TO EACH OTHER

(71) Applicant: HYPERTAC SA, Saint-Aubin-les-Elbeuf (FR)

(72) Inventors: Yvan Martin, Elbeuf (FR); Razvan Ilie, Rocquencourt (FR)

(73) Assignee: HYPERTAC SA, Saint-Aubin-les-Elbeuf (FR)

( * ) Notice: Subject to any disclaimer, the term of this patent is extended or adjusted under 35 U.S.C. 154(b) by 0 days.

(21) Appl. No.: 14/607,514

(22) Filed: Jan. 28, 2015

(65) Prior Publication Data

US 2015/0214641 A1 Jul. 30, 2015

(30) Foreign Application Priority Data

Jan. 29, 2014 (FR) .................................... 14 50688

(51) Int. Cl.
| | | |
|---|---|---|
| H01R 3/00 | (2006.01) | |
| H01R 11/28 | (2006.01) | |
| H01M 2/10 | (2006.01) | |
| H01M 2/20 | (2006.01) | |
| H01R 101/00 | (2006.01) | |

(52) U.S. Cl.
CPC ............ *H01R 11/281* (2013.01); *H01M 2/1077* (2013.01); *H01M 2/206* (2013.01); *H01R 11/288* (2013.01); *H01M 2220/20* (2013.01); *H01R 2101/00* (2013.01)

(58) Field of Classification Search
CPC .................................................... H01R 11/288
USPC ......... 439/485, 487, 500, 507, 510, 511, 627, 439/639
See application file for complete search history.

(56) References Cited

U.S. PATENT DOCUMENTS

| | | | | |
|---|---|---|---|---|
| 4,607,904 A | * | 8/1986 | D'Alessandro ..... | H01M 2/1011 439/476.1 |
| 5,462,453 A | * | 10/1995 | Muller ................. | H01R 13/115 439/504 |
| 5,977,485 A | * | 11/1999 | Yoshimura ............ | H01M 2/206 174/135 |
| 6,328,604 B1 | * | 12/2001 | Inoue .................... | H01M 2/206 439/521 |
| 7,029,787 B2 | * | 4/2006 | Bando ................. | H01M 2/1077 429/156 |
| 7,232,324 B2 | * | 6/2007 | Oesterhaus .......... | H01R 4/4827 439/268 |
| 9,088,040 B2 | * | 7/2015 | Kinoshita ........... | H01M 2/1077 |
| 2004/0166727 A1 | | 8/2004 | Ling et al. | |
| 2006/0083980 A1 | | 4/2006 | Choo et al. | |
| 2012/0034499 A1 | | 2/2012 | Meehan | |

FOREIGN PATENT DOCUMENTS

| | | |
|---|---|---|
| EP | 0834944 A1 | 4/1998 |
| WO | 2005/043650 A2 | 5/2005 |
| WO | 2012/051510 A2 | 4/2012 |

OTHER PUBLICATIONS

Search Report issued Aug. 14, 2014 in corresponding FR application No. 1450688.

* cited by examiner

*Primary Examiner* — Tho D Ta
(74) *Attorney, Agent, or Firm* — Knobbe Martens Olson & Bear LLP (57) ABSTRACT

A system is electrically connects at least one first electrical equipment unit and one second electrical equipment unit. The system includes at least one connecting member including a first connector and a second connector respectively adapted so as to receive the first connector and the second connector along the direction of connection. The connecting member includes a bridge electrically connecting the first connector and the second connector. The system further includes an electrically insulating shell cover defining a chamber that receives the connecting member and having portions situated on either side of the bridge along the direction of connection. The chamber and the bridge are configured to enable an upward flow of air from the first portion to the second portion, and a downward flow of air from the second portion to the first portion. The upward flow of air is brought about in contact with the bridge.

13 Claims, 7 Drawing Sheets

SYSTEM FOR ELECTRICALLY CONNECTING EQUIPMENT UNITS TO EACH OTHER

BACKGROUND OF THE INVENTION (1) Field of the Invention

The present invention relates to a system for electrically connecting at least one first electrical equipment unit and one second electrical equipment unit to each other.

The invention also relates to an assembly comprising of the electrical equipment units and such a system. Such an assembly is for example operationally implemented in an electric or hybrid motor vehicle.

(2) Description of Related Art

The first electrical equipment unit and the second electrical equipment unit are, for example batteries that are capable of supplying an electric current, for example to an electric motor vehicle.

The first battery and the second battery are generally connected to each other in series. In order to do this, it is a known practice to make use of a significantly sized contact component for example, between a positive terminal of the second battery and a negative terminal of the first battery. The volume of the contact component, and therefore its conductive nature, makes it possible to minimise the electrical resistance of the contact between the positive terminal and the negative terminal. Thus, the release of heat due to the Joule effect at the level of the contact component is minimised in a manner so as to prevent excessive heating of the contact component, which is all the more significant given that the contact component is in general confined within an electrically insulating sheath for reasons of security or within an insulating protective jacket or casing.

Such contact components are fairly satisfactory, but they are dimensionally cumbersome and potentially difficult to install or to use.

An object of the invention is therefore to provide a system for electrically connecting at least one first equipment unit and one second equipment unit to each other, which is easy to use and has modest dimensions, while also not bringing about excessive heating at the level of the contact component.

BRIEF SUMMARY OF THE INVENTION

To this end, the object of the invention relates to a system for electrically connecting at least one first electrical equipment unit and one second electrical equipment unit to each other, each of the first electrical equipment unit and the second electrical equipment unit including at least one first connector and one second connector, the said connectors being male or female connectors extending along the same direction of connection that is common to the first electrical equipment unit and the second electrical equipment unit, with the direction of connection being meant to be substantially vertical, the system comprising:

at least one connecting member comprising a first female or male connector and a second female or male connector respectively adapted so as to receive the first male or female connector of the second electrical equipment unit and the second male or female connector of the first electrical equipment unit along the direction of connection, the connecting member including a bridge electrically connecting the first female or male connector and the second female or male connector, with the bridge being suitable for being heated during the operation of the system, and an electrically insulating shell cover defining a chamber that receives the connecting member, the chamber having a first portion and a second portion situated on either side of the bridge along the direction of connection, the chamber and the bridge being configured in order to enable an upward flow of air from the first portion to the second portion, the upward flow of air being brought about in contact with the bridge, and in order to enable a downward flow of air from the second portion to the first portion.

According to particular embodiments, the system includes one or more of the following characteristic features, taken into consideration in isolation or in accordance with all technically possible combinations:

the direction of connection is intended to form along with the vertical, an angle of less than 45 degrees during the operation thereof, preferably less than 5°;

the bridge defines at least one conduit capable of enabling a downward flow of air through the conduit from the second portion of the chamber to the first portion;

the first connector and the second connector are female connectors, the first connector of the second electrical equipment unit and the second connector of the first electrical equipment unit are male connectors, and the first connector and the second connector comprise of a body that has a generally cylindrical form and with an axis that is substantially parallel to the direction of connection in order to receive respectively the first connector of the second electrical equipment unit and the second connector of the first electrical equipment unit;

the first connector and the second connector are capable of enabling the flow of air through the body substantially along the direction of connection, with the first connector and the second connector preferably comprising at least one metal wire wound around the direction of connection and intended to be interposed between the body and respectively, the first connector of the second electrical equipment unit and the second connector of the first electrical equipment unit;

the first connector and the second connector comprise a plurality of fins protruding out from the body;

the fins are in contact with a wall of the chamber;

the fins have a form shaped so as to be elongated along the direction of connection;

the chamber has a third portion and a fourth portion situated on either side of the first connector along the direction of connection, the chamber, the first connector and the bridge being configured in order to enable an upward flow of air from the first portion to the fourth portion via the third portion, the upward flow of air being brought about in contact with the first connector, and in order enable a downward flow of air from the fourth portion to the first portion;

the bridge defines at least one conduit capable of enabling a downward flow of air through the conduit, from the fourth portion of the chamber to the first portion; and the system includes a third female or male connector and a fourth female or male connector respectively capable of receiving the second connector of the second electrical equipment unit and the first connector of the first electrical equipment unit along the direction of connection, and two insulation shells capable of electrically insulating respectively the third connector and the fourth connector, the two insulation shells being accommodated respectively in a first housing and a second housing defined by the shell in a mounted position of the third connector and the fourth connector.

The invention also relates an assembly comprising:
at least one first electrical equipment unit and one second electrical equipment unit, each of the first electrical equipment unit and the second electrical equipment unit including at least one first connector and one second connector, the said connectors being male or female connectors extending along the same direction of connection which is common to the first electrical equipment unit and the second electrical equipment unit, and
a system as defined here above, the system electrically connecting the first electrical equipment unit and the second electrical equipment unit to each other, with the first female or male connector and the second female or male connector respectively receiving the first male or female connector of the second electrical equipment unit and the second male or female connector of the first electrical equipment unit along the direction of connection.

BRIEF DESCRIPTION OF THE SEVERAL VIEWS OF THE DRAWINGS

The invention will be better understood upon reading the description which follows, given only by way of example and with reference being made to the accompanying drawings in which.

DETAILED DESCRIPTION OF THE INVENTION

Figure 1:
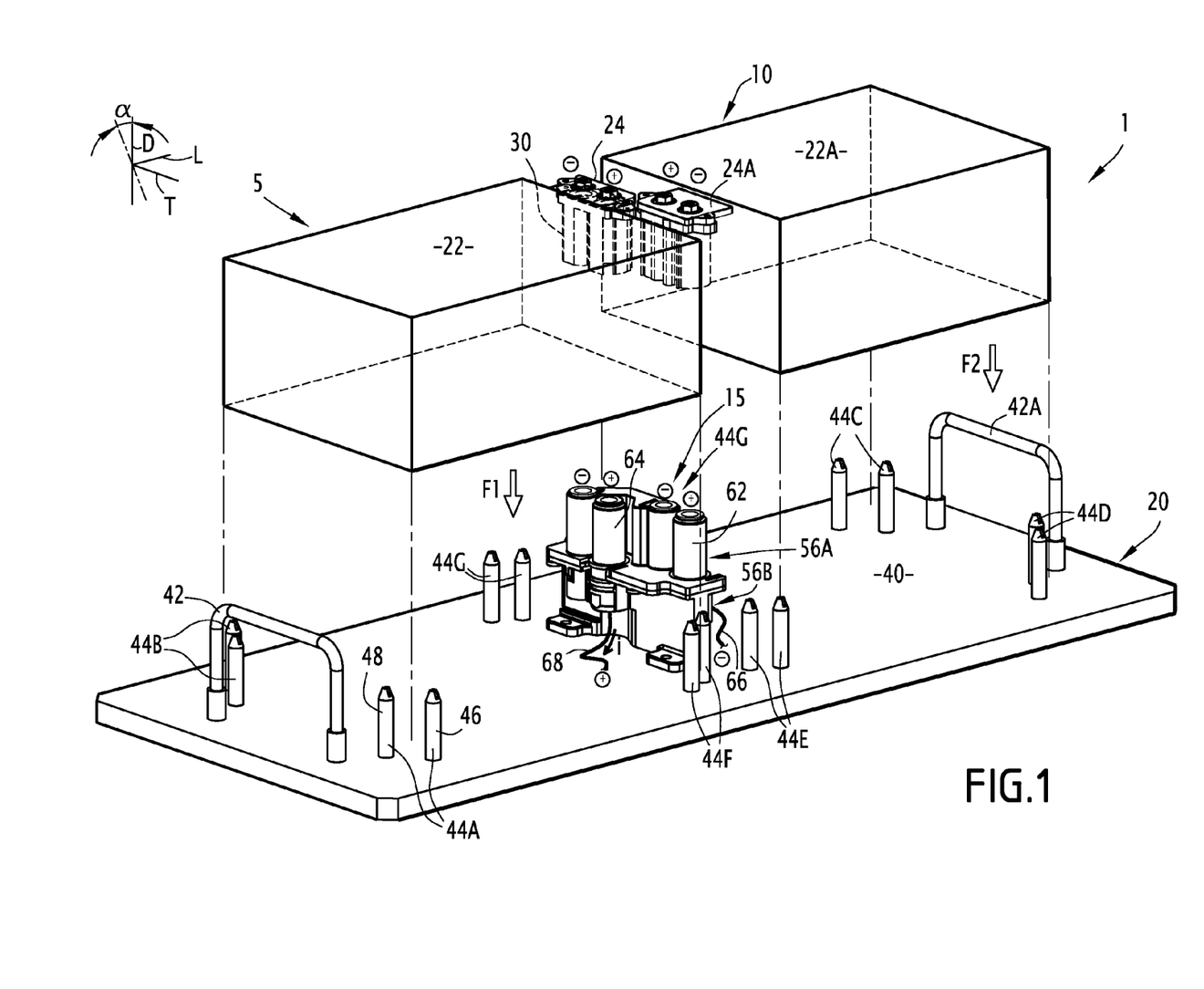
FIG. 1 is a view in perspective schematically representing an assembly according to the invention.

With reference to FIG. 1, an assembly 1 according to the invention is described therein. The assembly 1 is for example intended to be placed in an electric or hybrid motor vehicle (not shown). The assembly 1 is adapted for supplying electrical power to the motor vehicle. The assembly 1 is advantageously removable.

The assembly 1 comprises a first electrical equipment unit, which is for example, a first battery 5, a second electrical equipment unit, which is for example a second battery 10, a system 15 for electrically connecting the first electrical equipment unit and the second electrical equipment unit to each other, and a support component 20 capable of accommodating the system 15, as well as the first battery 5 and the second battery 10.

According to variant embodiments not represented, the first electrical equipment unit and the second electrical equipment unit are equipment units other than batteries.

According to other variant embodiments not represented, the first electrical equipment unit and the second electrical equipment unit are different in nature from each other.

In the example shown, the first battery 5 and the second battery 10 are advantageously substantially analogous, as such only the first battery will be described in detail.

The first battery 5 has a generally parallelepiped shaped form. The first battery 5 comprises a body 22 containing internal members (not shown) meant to serve the purposes of generating electricity, a connection board 24 protruding out from the body 22, a first male connector 26 (FIG. 2) forming for example a positive terminal of the first battery, and a second male connector 28 forming for example a negative terminal. The first battery 5 also comprises a protective shell cover 30 capable of protecting the first connector and the second connector from potential undesirable or inadvertent contacts, in particular with a person (not shown), manipulating the first battery 5.

Figure 2:
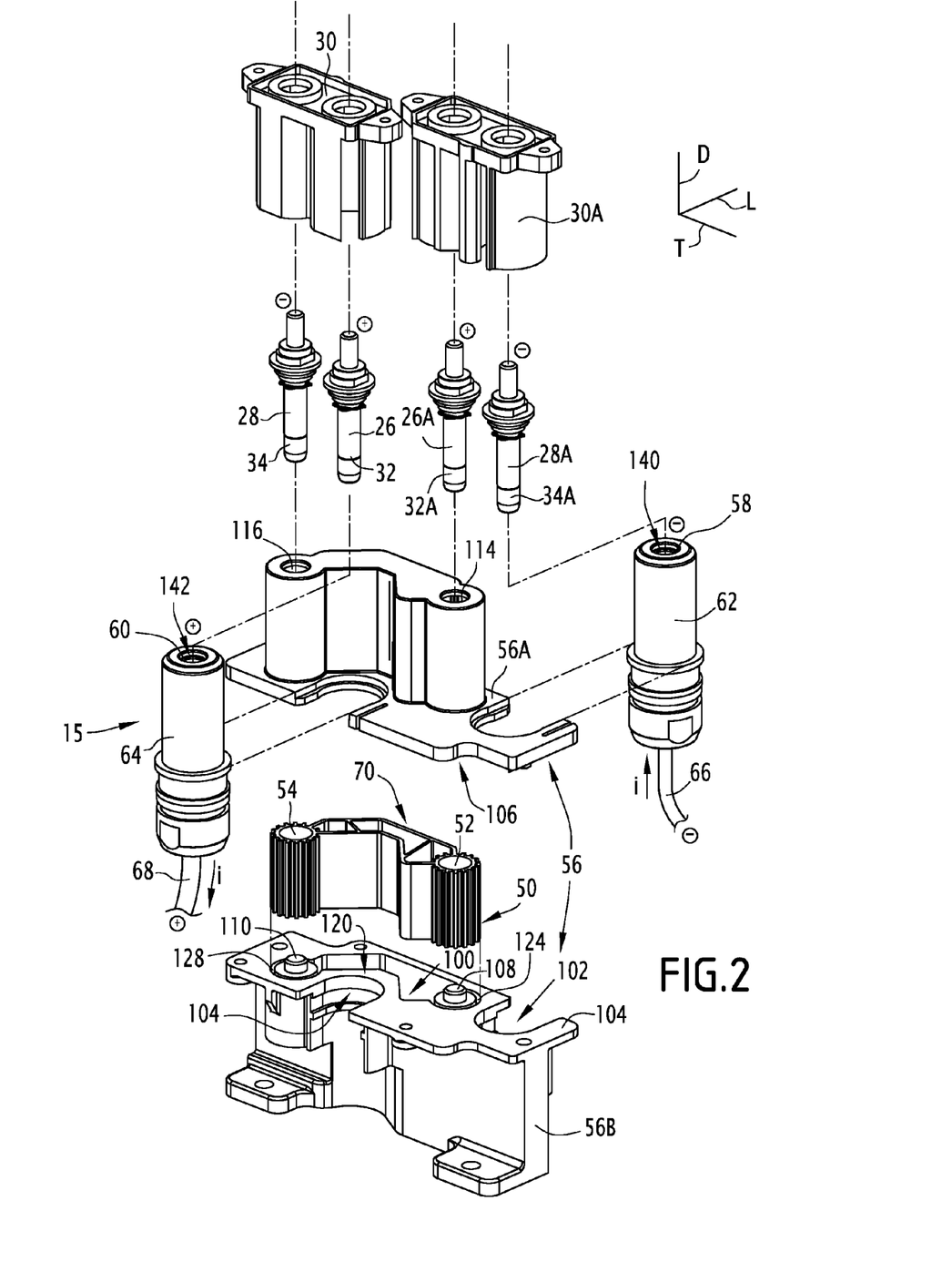
FIG. 2 is an exploded view representing the connectors of a first electrical equipment unit and a second electrical equipment unit of the assembly shown in FIG. 1, and the system shown in FIG. 1 and which electrically connects the first electrical equipment unit and the second electrical equipment unit to each other.

The first connector 26 extends substantially along a direction of connection D. The first connector 26 is integrally secured to the connection board 24 and electrically connected to the internal members of the first battery 5. The first connector 26 includes an end portion 32 that is substantially cylindrical, intended for penetrating within the system 15.

The second connector 28 is analogous to the first connector 26 and will not be described in detail.

The protective shell cover 30 is fastened on to the connection board 24. The protective shell cover 30 is made, for example, out of an insulating material. The protective shell cover 30, the first connector 26 and the second connector 28 together form a plug capable of connecting the first battery 5 to the system 15 along the direction of connection D.

The second battery 10 includes elements that are similar to those of the first battery 5. The similar elements bear the same reference numerals followed by the letter A. The second battery 10 includes in particular a body 22A, a tab 24A, a first male connector 26A forming a positive terminal, a second male connector 28A forming a negative terminal, and a protective shell cover 30A.

The direction of connection D is intended to form with the vertical an angle α (FIG. 1) measuring less than 45°, preferably less than 5°, while the assembly 1 is in use.

Figure 5:
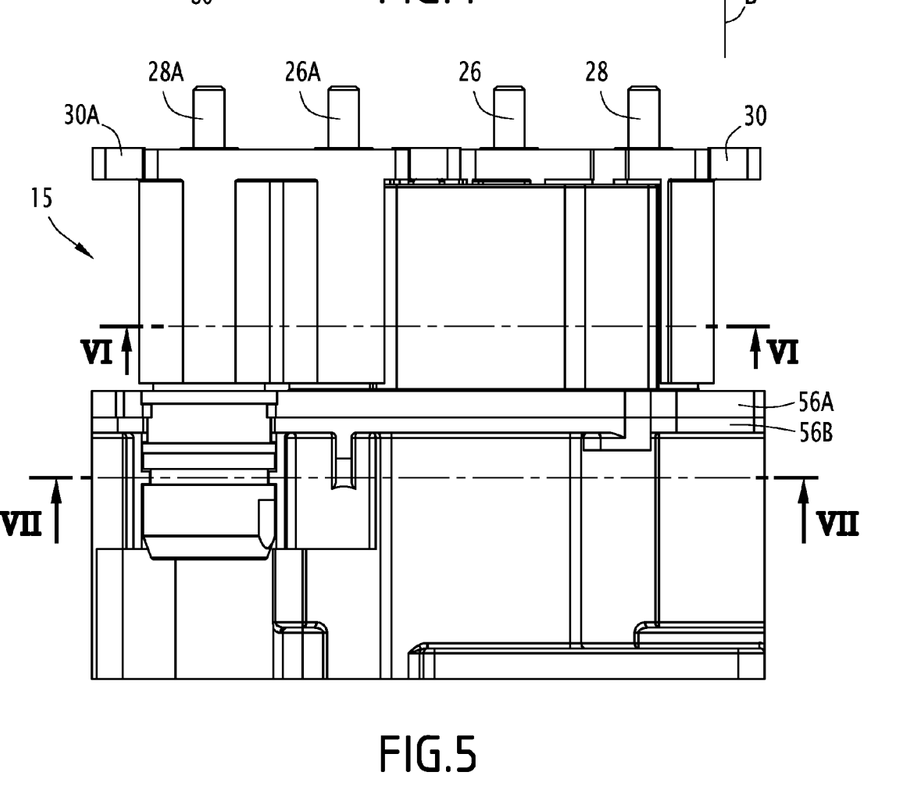
FIG. 5 is a front view of the system shown in FIGS. 1 to 3, and of the connectors of the first electrical equipment unit and the second electrical equipment unit, with the connectors being accommodated within the system.

The first battery 5 and the second battery 10 are movable between a disconnected position (represented in FIG. 1) in which they are situated at a distance away from the system 15, and a connected position in which the first connectors 26, 26A and the second connectors 28, 28A are received within the system 15 as represented in the FIG. 5. The connected position is derived from the disconnected position by means of a translational motion of the first battery 5 and the second battery 10 along the direction of connection D according to the arrows F1 and F2 visible in FIG. 1.

The support component 20 (FIG. 1) comprises a plate 40, two handles 42, 42A, and the blocking systems 44A, 44B, 44C, 44D, 44E, 44F, 44G which are capable of blocking and centering the first battery 5 and the second battery 10 when the latter are received on the support component 20.

The plate 40 is for example generally rectangular in shape and adapted to the dimensions of the first battery 5 and the second battery 10. The plate 40 is for example substantially perpendicular the direction of connection D.

The handles 42, 42A are advantageously located on the two ends of the plate 40 along a longitudinal direction L that is substantially perpendicular to the direction of connection D.

The handles 42, 42A protrude out from the plate 40 on the side of the first battery 5 and the second battery 10 when they are received on the support component 20 in their connected position. The handles 42, 42a are adapted for the gripping thereof by a user (not shown) for manipulating the assembly 1.

Each blocking system 44A to 44G is capable of interacting with a corner of one or the other of the first battery 5 and the second battery 10, in a manner so as to limit the movements of these batteries along all directions that are perpendicular to the direction of connection D.

Each of the blocking systems 44A to 44G is for example formed by two rods 46, 48 fastened on to the plate 40.

The rods 46, 48 are advantageously substantially parallel to the direction of connection D.

The system 15 is advantageously attached on to the support component 20, at a suitable positional location in order for the system 15 to be situated between the first battery 5 and the second battery 10 when these latter are received on the support component 20 in the connected position. For example, the system 15 is fastened on to the plate 40 substantially in the middle of the latter along the longitudinal direction L.

According to a variant not shown, the system 15 is fastened to the first electrical equipment unit or on to the second electrical equipment unit instead of being fastened on to the support component 20, or the system 15 is integrally secured to the first electrical equipment unit or the second electrical equipment unit instead of being integrally secured to the support component 20.

Figure 3:
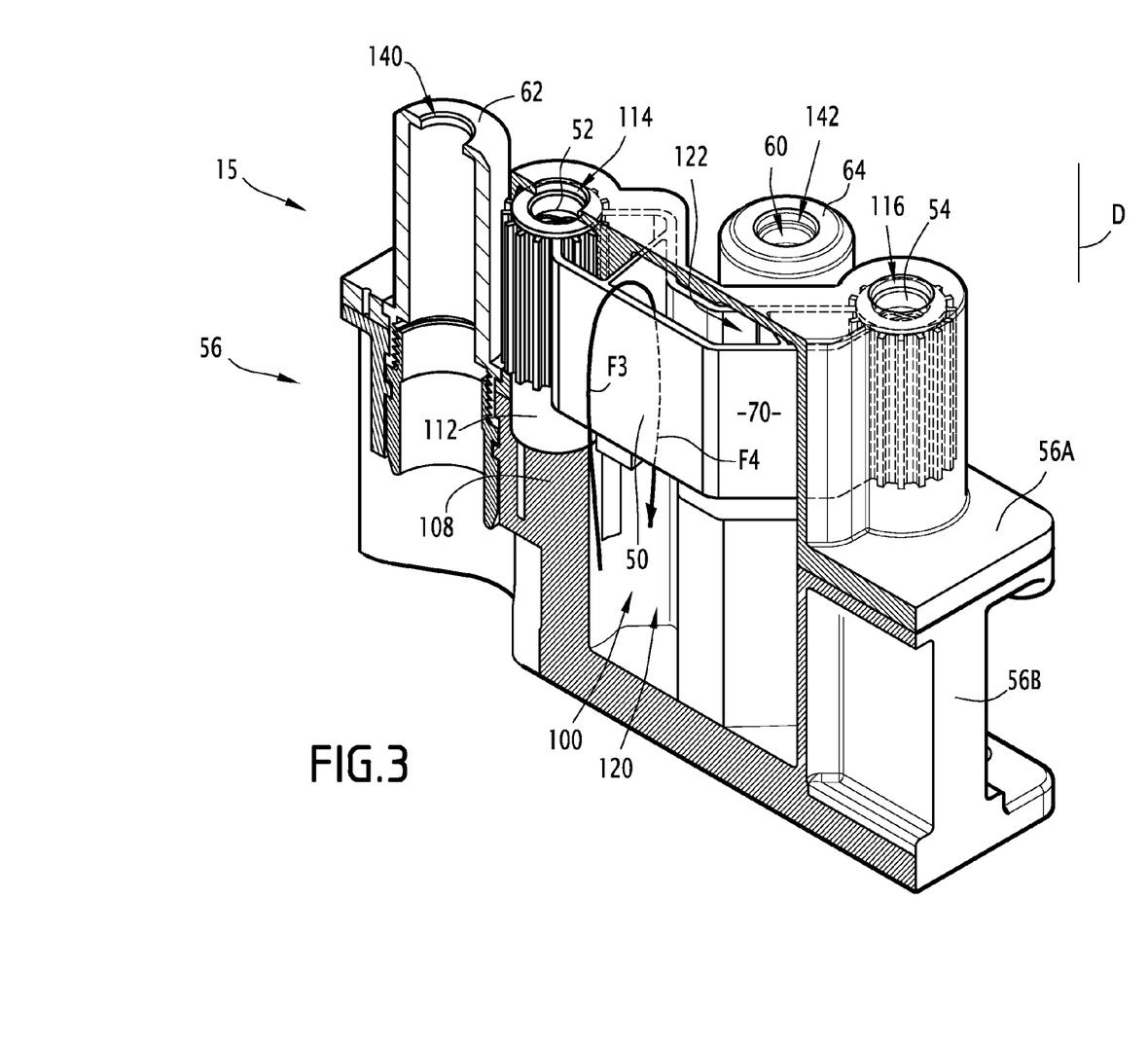
FIG. 3 is a view in perspective, partially broken away, of the system shown in FIGS. 1 and 2, with the system being in the mounted state.

As is visible in FIGS. 2 and 3, the system 15 comprises a connecting member 50 including a first female connector 52 and a second female connector 54 respectively capable of receiving the first connector 26A of the second battery 10 and the second connector 28 of the first battery 5, and a shell cover 56 that is electrically insulating and advantageously formed of two portions 56A and 56B. The system 15 also includes a third female connector 58 and a fourth female connector 60 adapted respectively in order to receive the second connector 28A of the second battery 10 and the first connector 26 of the first battery 5, and two insulating shell covers 62, 64 capable of electrically insulating respectively the third connector 58 and the fourth connector 60. The system 15 finally comprises two electrical cables 66, 68 respectively connected electrically to the third connector 58 and the fourth connector 60.

According to variant embodiments not represented:
the first connector 26A is a female connector and the first connector 52 is a male connector, and/or
the second connector 28A is a female connector and the third connector 58 is a male connector, and/or
the first connector 26 is a female connector and the fourth connector 60 is a male connector, and/or
the second connector 28 is a female connector and the second connector 54 is a male connector The term "electrically insulating", is used to signify "using an insulating material".

Figure 4:
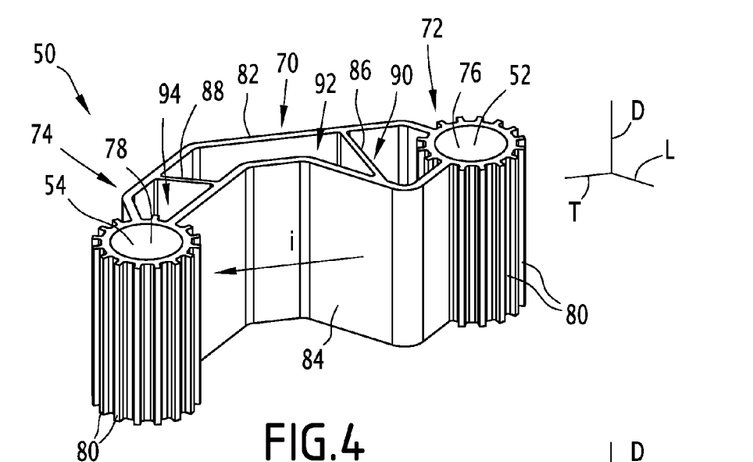
FIG. 4 is a view in perspective of a connecting member of the system shown in FIGS. 1 to 3.

As represented in FIG. 4, the connecting member 50 is, for example metallic. The connecting member 50 advantageously comprises a conductive metal alloy, which is for example light. The connecting member 50 is advantageously an integral unit, that is to say composed of one single piece.

The connecting member 50 includes a bridge 70 electrically connecting the first connector 52 and second connector 54.

The first connector 52 and the second connector 54 are advantageously substantially identical from the structural point of view. The first connector 52 and the second connector 54 are located substantially on two ends 72, 74 of the bridge 70 opposite to each other in a transverse direction T that is substantially perpendicular to the direction of connection D and advantageously substantially perpendicular to the longitudinal direction L.

Each of the first connector 52 and the second connector 54 comprises a body having a generally cylindrical form with axis substantially parallel to the direction of connection D. The body defines an interior housing 76, 78 adapted for receiving respectively the first connector 26A of the second battery 10 and the second connector 28 of the first battery 5. Each of the first connector 52 and the second connector 54 advantageously includes fins 80 extending radially towards the exterior of each of the first connector 52 and the second connector 54 from of the body.

The first connector 52 and the second connector 54 are advantageously capable of enabling the flow of air in the interior housings 76, 78 along the direction of connection D.

The first connector 52 and second connector 54 preferably comprises at least one metal wire 79 wound around the direction of connection D and intended to be interposed between the body and respectively the first connector 26A of the second battery 10 and the second connector 28 of the first battery 5.

Figure 6:
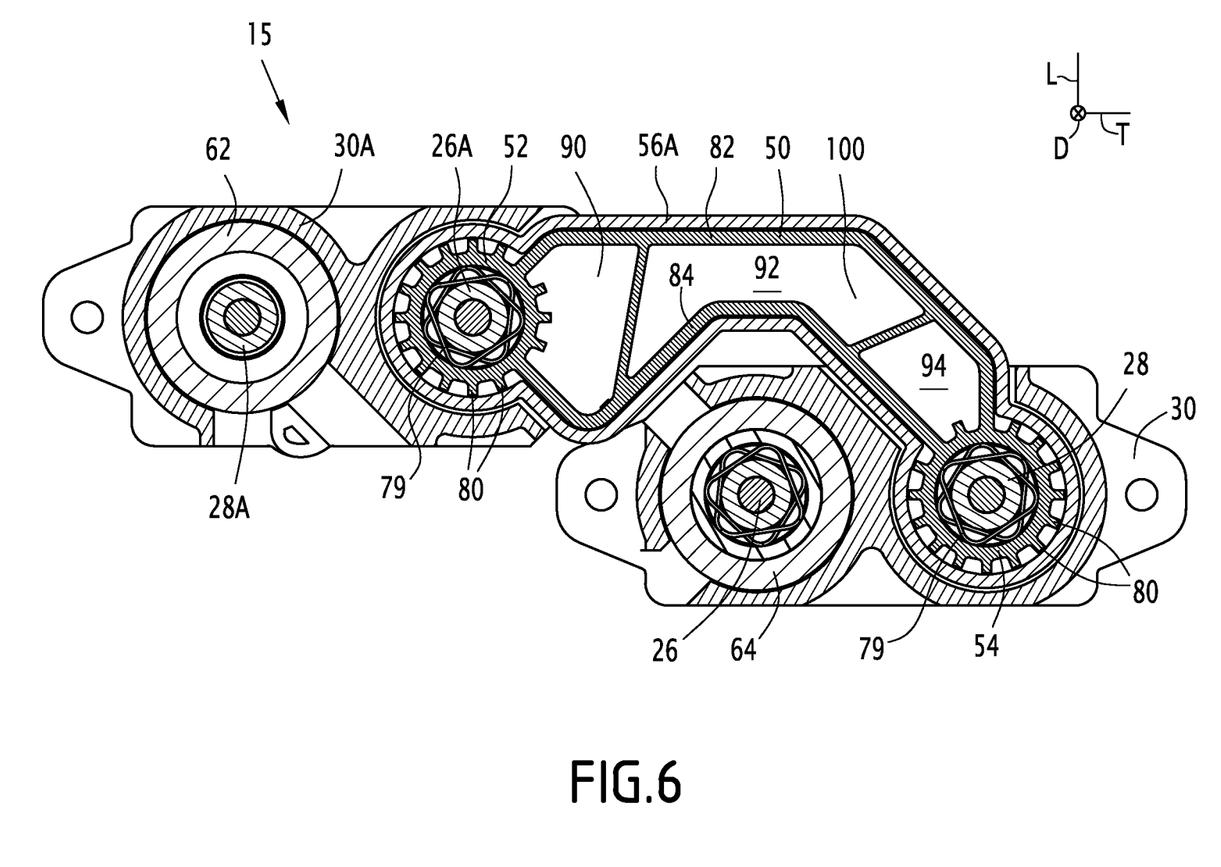
FIGS. 6 and 7 are cross sectional views of the device represented in FIG. 5, respectively along two planes that are substantially perpendicular to the direction of connection.
Figure 7:
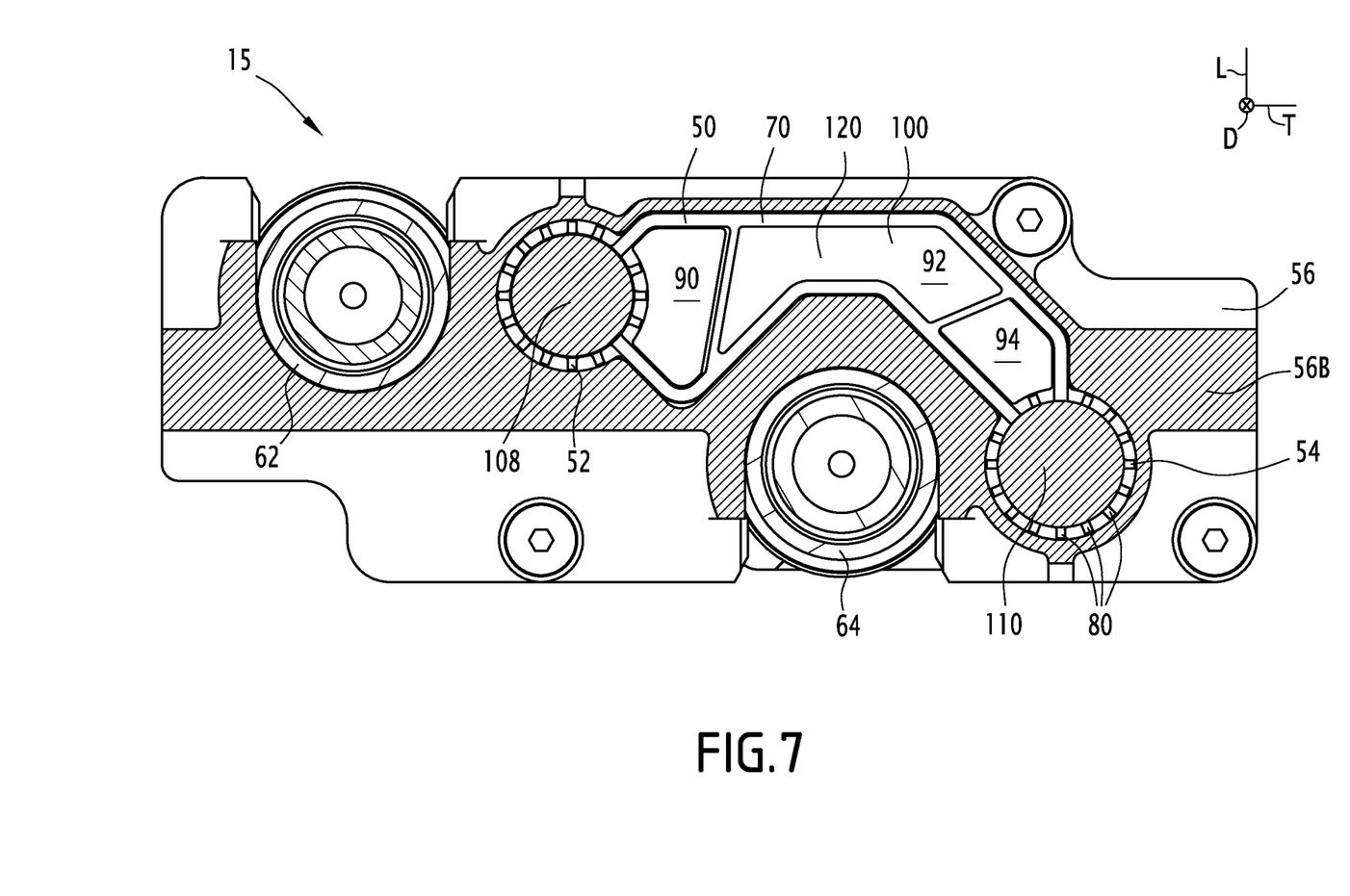

The metal wire 79 has for example a substantially polygonal profile when viewed along the direction of connection D (FIG. 6).

By way of a variant (not shown), the metal wire 79 defines a layer having for example a generally hyperboloid shaped form, according to one method known per se by the person skilled in the art in the field of connectors.

The fins 80 extend for example substantially parallel to the direction of connection D. The fins 80 are advantageously distributed angularly in a uniform manner over the periphery of each of the first connector 52 and the second connector 54.

The bridge 70 comprises, for example two lateral walls 82, 84 connecting the first connector 52 and the second connector 54, and for example at least two internal ribs 86, 88 connecting therebetween the lateral walls 82, 84 and defining three conduits 90, 92, 94.

The lateral walls 82, 84 and the ribs 86, 88 are advantageously substantially parallel to the direction of connection D.

The conduits 90, 92, 94 are open on both sides along the direction of connection D in a manner so as to allow the flow of air along the direction of connection D.

The shell cover 56 of the system 15 is for example made out of insulating material. The shell cover 56 advantageously comprises two half shells 56A and 56B (FIGS. 2, 3, 6, and 7). The shell cover 56 defines a chamber 100 capable of receiving the connecting member 50.

As is represented in FIG. 1, the half shell 56B is fastened on to the support component 20. The half shell 56B defines two housings 102, 104 (FIG. 2) capable of receiving the two insulation shells 62 and 64 of the third connector 58 and the fourth connector 60. The half shell 56B has a surface 104 that is advantageously substantially planar and substantially perpendicular to the direction of connection D, capable of cooperating by means of contact with a surface 106 of the half shell 56A.

The housings 102, 104 are for example capable of receiving the insulation shell covers 62, 64 by means of the translational motion of these latter along the longitudinal direction L.

The half shell 56B defines two pads 108, 110 on which rest the connecting member 50. For example, the pad 108 receives the first connector 52 and the pad 110 receives the second connector 54.

Each of the pads 108, 110 advantageously has a generally cylindrical shaped form with an axis that is parallel to the direction of connection D. Advantageously, each of the pads 108, 110 is extended by means of a wedge 112 (FIG. 3) that provides the ability to place the connecting member 50 at a certain height along the direction of connection D within the interior of the half shell 56A.

The half shell 56A is adapted to be fastened on to the half shell 56B. The half shell 56A receives the connecting member 50 and as such it substantially takes on the shape thereof. The half shell 56A defines two openings 114, 116 that allow for the passing through of the first connector 26A and the second connector 28 respectively to the first connector 52 and the second connector 54 along the direction of connection D.

The half shell 56B forms a base for the shell cover 56.

The half shell 56A forms a cover for the shell cover 56.

The shell cover 56 is adapted to be capped by the insulating shells 30, 30A in the connected position of the first battery 5 and the second battery 10.

The chamber 100 (FIG. 3) comprises a first portion 120 and a second portion 122 located on either side of the bridge 70 along the direction of connection D. The chamber 100 and the bridge 70 are configured in order to enable an upward flow of air (represented by an arrow F3 in FIG. 3) from the first portion 120 to the second portion 122, and to enable a downward flow of air (represented by an arrow F4 in FIG. 3) from the second portion 122 to the first portion 120.

Figure 8:
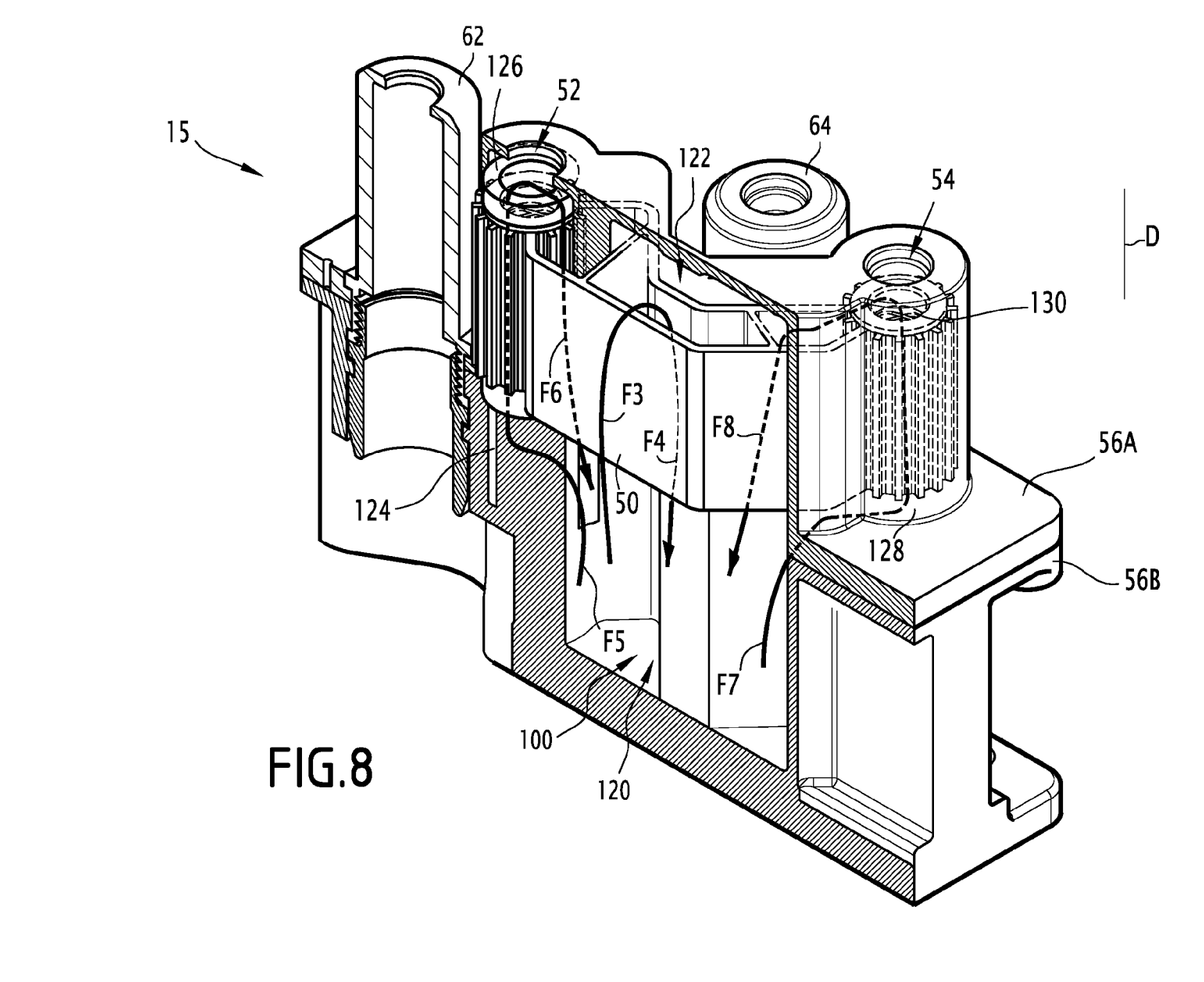
FIG. 8 is a view in perspective, partially broken away, of a variant of the system shown in FIGS. 1 to 3, the variant being in the mounted state.

According to one variant represented in FIG. 8, the chamber 100 also includes a third portion 124 and a fourth portion 126 located on either side of the first connector 52 along the direction of connection D and a fifth portion 128 and a sixth portion 130 located on either side of the second connector 54 along the direction of connection D.

In this variant embodiment, the chamber 100, the first connector 52 and the bridge 70 are configured in order to enable an upward flow of air (represented by an arrow F5 in FIG. 8) from the first portion 120 to the fourth portion 130 via the third portion 128, and in order to enable a downward flow of air (represented by an arrow F6 in FIG. 8) from the fourth portion 130 to the first portion 120. Similarly, the chamber 100, the second connector 54 and the bridge 70 are configured in order to enable an upward flow of air (represented by an arrow F7 in FIG. 8) from the first portion 120 to the sixth portion 130 through the fifth portion 128, and in order to enable a downward flow of air (represented by an arrow F8 in FIG. 8) from the sixth portion 130 to the first portion 120.

With reference to FIG. 3, the upward flow of air F3 is brought about in contact with the bridge 70.

The downward flow of air F4 is advantageously brought about via the conduit 92 of the bridge 70.

In the variant embodiment represented in FIG. 8, the descending flows of airs along the direction of the arrows F6 and F8 are advantageously brought about via the conduits 90, 94 of the bridge 70.

The first portion 120 of the chamber 100 is situated below the bridge 70, that is to say on the side of the support component 20 relative to the bridge 70 along the direction of connection D.

In the variant represented in FIG. 8, the first chamber 120 communicates with the third chamber 124 and the fifth chamber 128.

The third chamber 124 and the fifth chamber 128 have for example an annular shaped form surrounding the pads 108, 110. The third chamber 124 and the fifth chamber 128 are situated below the first connector 52 and the second connector 54, advantageously in the extension of the first connector 52 and the second connector 54 along the direction of connection D.

The fourth chamber 126 and the sixth chamber 130 are located above respectively the first connector 52 and the first connector 54. The fourth chamber 126 and the sixth chamber 130 communicate with the second chamber 122.

By way of a variant (not shown), the walls of the chamber 100 defining the fins extending in one or more of the portions 120, 122, 124, 126, 128, 130 of the chamber.

The third connector 58 and the fourth connector 60 have a generally cylindrical shaped form with an axis that is parallel to the direction of connection D.

The insulation shells 62, 64 have a generally cylindrical shaped form substantially matching that of the third connector 58 and the fourth connector 60, respectively. The insulation shells 62, 64 respectively define the openings 140, 142 that are adapted so as to let pass the second connector 28A of the second battery 10 and the first connector 26 of the first battery 5.

When the third connector 58 is received in the housing 102 formed by the shell cover 56, the third connector 58 and the first connector 52 together form a female socket that is capable of receiving the connection plug of the second battery 10.

Similarly, when the fourth connector 60 is received in the housing 104 formed by the shell cover 56, the fourth connector 60 and the second connector 54 together form a female socket capable of receiving the connection plug of the first battery 5.

The operation of the assembly 1 will now be described.

As is represented in FIG. 1, the support component 20 and the system 15 advantageously form a block that is easy to handle thanks to the handles 42, 42A.

In order to connect the first battery 5 and the second battery 10 to each other, the first battery 5 and the second battery 10 are moved from their disconnected position to their connected position. In order to do this, they are caused to move in translational motion for example, from the disconnected position represented in FIG. 1 along the direction of connection D along the direction of the arrows F1 and F2. The bodies 22 and 22A come to be wedged into the blocking systems 44A to 44G of the support component 20. The first connectors 26, 26A and the second connectors 28, 28A of the first battery 5 and the second battery 10 come to be placed respectively in the fourth connector 60, the first connector 52, the second connector 54, and the third connector 58 of the system 15. The protective shell covers 30, 30A come to be placed over the shell cover 56 (in the example over the half shell 56A) and over the insulating shells 62, 64. The first battery 5 and the second battery 10 are then in their connected position.

This brings about formation of an electrical circuit. The electrical energy from the first battery 5 and the second battery 10 is recovered over the cables 66, 68.

The cable 68 constitutes a positive terminal. The cable 68 is electrically connected to the fourth connector 60 of the system 15. The fourth connector 60 is electrically connected to the first connector 26 of the first battery 5. The first connector 26 constitutes a positive terminal connected to the internal members of the first battery 5. The second connector 28 constitutes a negative terminal of the first battery 5 and is connected to the second connector 54 of the system 15. The second connector 54 is electrically connected by the bridge 70 to the first connector 52. The first connector 52 is in electrical contact with the first connector 26A of the second battery 10. The second connector 26A constitutes a positive terminal of the second battery 10. The first connector 26A is connected to the internal members of the second battery 10. The second connector 28A of the second battery 10 constitutes a negative terminal of the second battery 10. The second connector 28A is in electrical contact with the third connector 58 of the system 15. The third connector 58 is electrically connected to the cable 66 which constitutes a negative output terminal.

In use, a current i exits out through the cable 68. This same current i enters through the cable 66. The same current i passes through the connecting member 50 from the first connector 52 to the second connector 54. This brings about the heating of the connecting member 50 due to the Joule effect, in particular on account of the contact resistances between the first connector 52 and the first connector 26A on the one hand, and between the second connector 28 and the second connector 54 on the other hand, as well as in all the conductive parts of the connecting member 50.

Thanks to the upward flow of air F3 (FIG. 3), the cold air present in the first portion 120 of the chamber 100 comes into contact with the bridge 70 and gets heated while cooling the bridge 70. The heated air is found in the second portion 122 of the chamber 100.

Thanks to the downward flow of air F4, the heated air moves back down via the conduit 92 and returns into the first portion 120 where it cools on contact with the walls of the first portion 120. It is understood that the walls of the first portion 120 of the chamber 100 act as a cold source enabling the cooling of the inside air contained in the chamber 100. The first portion 120 constitutes a reservoir of cold air.

The bridge 70 acts as a heat source for the air contained in the chamber 100.

The temperature of the connecting member 50 comes to equilibrium between the bridge 70 and 52 the first connector the one hand and the second connector 54 on the other hand by means of thermal conduction.

In addition, the heat that is generated at the first connector 52 and the second connector 54 passes into the chamber 100 through the fins 80 and then into the shell cover 56 by means of conduction-convection so as to be discharged to the exterior of the system 15.

In the variant illustrated in FIG. 8, the flows of air materially represented by the arrows F5, F6, F7 and F8 make it possible to transport the heat generated at the level of the first connector 52 and the second connector 54 up to the first portion 120 of the chamber 100. The cold air originating from the first portion 120 enters into the third portion 124 (arrow F5), and into the fifth portion 128 (arrow F7) and is distributed around the pads 108, 110. Then the air passes along the fins 80 which define the paths for air flow substantially along the direction of connection D. The air gets heated in contact with the first connector 52 and the second connector 54 and arrives in the fourth portion 126 and the sixth portion 130 of the chamber 100. The air then moves down again (arrows F6, F8) via the conduits 90, 94 in order to return to the first portion 120.

Due to the characteristic features described above, the system 15 electrically connects the first electrical equipment unit and the second electrical equipment unit to each other. The connection is simple to implement.

In addition, due to the evacuation of the heat generated in the connecting member 50, the system does not give rise to excessive heating at the level of the contacts between the first battery 5 and the second battery 10. Furthermore, the assembly 1 is easy to handle and manipulate.

By way of a variant (not shown), the assembly 1 comprises more than two electrical equipment units. Some of these electrical equipment units are connected to each other by systems that are analogous to the system 15, in order to create electrical circuits that are analogous to the circuit going from the cable 66 to the cable 68.

For example, three batteries are connected to each other in series by making use of two systems that are analogous to the system 15, these systems being located respectively between the first and the second batteries, and between the second and the third batteries.

The invention claimed is:

1. A system for electrically connecting at least one first electrical equipment unit and one second electrical equipment unit to each other, each of the first electrical equipment unit and the second electrical equipment unit including at least one first connector and one second connector, said connectors being male or female connectors extending along a same direction of connection D that is common to the first electrical equipment unit and the second electrical equipment unit, with the direction of connection D being meant to be substantially vertical, the system comprising:
   at least one connecting member including a first female or male connector and a second female or male connector respectively adapted so as to receive the first male or female connector of the second electrical equipment unit and the second male or female connector of the first electrical equipment unit along the direction of connection D, the connecting member including a bridge electrically connecting the first female or male connector and the second female or male connector, with the bridge being suitable for being heated during the operation of the system, and
   an electrically insulating shell cover defining a chamber that receives the connecting member, the chamber having a first portion and a second portion situated on either side of the bridge along the direction of connection D, the chamber and the bridge being configured in order to enable an upward flow of air from the first portion to the second portion, the upward flow of air being brought about in contact with the bridge, and in order to enable a downward flow of air from the second portion to the first portion,
   wherein:
   the first connector and the second connector of the connecting member are female connectors;
   the first connector of the second electrical equipment unit and the second connector of the first electrical equipment unit are male connectors, and
   the first connector and the second connector of the connecting member comprise of a body that has a generally cylindrical form and with an axis that is substantially parallel to the direction of connection D in order to receive respectively the first connector of the second electrical equipment unit and the second connector of the first electrical equipment unit.

2. The system according to claim 1, wherein the direction of connection D forms an angle of less than 45 degrees with a vertical direction during the operation thereof.

3. The system according to claim 1, wherein the bridge defines at least one conduit capable of enabling a downward flow of air through the conduit from the second portion of the chamber to the first portion.

4. The system according to claim 1, wherein the direction of connection D forms an angle of less than 5° with a vertical direction.

5. The system according to claim 1, wherein the first connector and the second connector of the connecting member comprise a plurality of fins protruding out from the body.

6. The system according to claim 5, wherein the fins are in contact with a wall of the chamber.

7. The system according to claim 5, wherein the fins have a shape that is elongated along the direction of connection D.

8. The system according to claim 1, wherein the chamber has a third portion and a fourth portion situated on either side of the first connector of the connecting member along the direction of connection D, the chamber, the first connector of the connecting member and the bridge being configured in order to enable an upward flow of air from the first portion to the fourth portion via the third portion, the upward flow of air being brought about in contact with the first connector of the connecting member, and in order enable a downward flow of air from the fourth portion to the first portion.

9. The system according to claim 8, wherein the bridge defines at least one conduit capable of enabling a downward flow of air through the conduit, from the fourth portion of the chamber to the first portion.

10. The system according to claim 1, wherein the first connector and the second connector of the connecting member are adapted for enabling a flow of air through the body substantially along the direction of connection D.

11. The system according to claim 10, wherein the second connector of the connecting member comprises at least one metal wire wound around the direction of connection D and is intended to be interposed between the body and respectively, the first connector of the second electrical equipment unit and the second connector of the first electrical equipment unit.

12. A s stem for electrically connecting at least one first electrical equipment unit and one second electrical equipment unit to each other, each of the first electrical equipment unit and the second electrical equipment unit including at least one first connector and one second connector, said connectors being male or female connectors extending along a same direction of connection D that is common to the first electrical equipment unit and the second electrical equipment unit, with the direction of connection D being meant to be substantially vertical, the system comprising:

at least one connecting member including a first female or male connector and a second female or male connector respectively adapted so as to receive the first male or female connector of the second electrical equipment unit and the second male or female connector of the first electrical equipment unit along the direction of connection D, the connecting member including a bridge electrically connecting the first female or male connector and the second female or male connector, with the bridge being suitable for being heated during the operation of the system, an electrically insulating shell cover defining a chamber that receives the connecting member, the chamber having a first portion and a second portion situated on either side of the bridge along the direction of connection D the chamber and the bridge being configured in order to enable an upward flow of air from the first portion to the second portion, the upward flow of air being brought about in contact with the bridge and in order to enable a downward flow of air from the second portion to the first portion;

a third female or male connector and a fourth female or male connector respectively capable of receiving the second connector of the second electrical equipment unit and the first connector of the first electrical equipment unit along the direction of connection, and two insulation shells capable of electrically insulating respectively the third connector and the fourth connector, the two insulation shells being accommodated respectively in a first housing and a second housing defined by the shell in a mounted position of the third connector and the fourth connector.

13. An assembly comprising:

at least one first electrical equipment unit and one second electrical equipment unit, each of the first electrical equipment unit and the second electrical equipment unit including at least one first connector and one second connector, said connectors being male or female connectors extending along a same direction of connection D which is common to the first electrical equipment unit and the second electrical equipment unit, and a system electrically connecting at least the first electrical equipment unit and the second electrical equipment unit to each other, with the direction of connection D being meant to be substantially vertical, wherein the system comprises:

at least one connecting member including a first female or male connector and a second female or male connector respectively adapted so as to receive the first male or female connector of the second electrical equipment unit and the second male or female connector of the first electrical equipment unit along the direction of connection D, the connecting member including a bridge electrically connecting the first female or male connector and the second female or male connector with the bridge being suitable for being heated during the operation of the system, and an electrically insulating shell cover defining a chamber that receives the connecting member, the chamber having a first portion and a second portion situated on either side of the bride along the direction of connection D the chamber and the bridge being configured in order to enable an upward flow of air from the first portion to the second portion, the upward flow of air being brought about in contact with the bridge, and in order to enable a downward flow of air from the second portion to the first portion, wherein the first female or male connector of the connecting member and the second female or male connector of the connecting member respectively receives the first male or female connector of the second electrical equipment unit and the second male or female connector of the first electrical equipment unit along the direction of connection D.

* * * * *